United States Patent [19]
Bjorn

[11] Patent Number: 6,035,398
[45] Date of Patent: Mar. 7, 2000

[54] CRYPTOGRAPHIC KEY GENERATION USING BIOMETRIC DATA

[75] Inventor: Vance Bjorn, San Carlos, Calif.

[73] Assignee: DigitalPersona, Inc., Redwood City, Calif.

[21] Appl. No.: 08/970,304

[22] Filed: Nov. 14, 1997

[51] Int. Cl.[7] .................................................. H04L 9/32
[52] U.S. Cl. ......................................... 713/186; 713/185
[58] Field of Search .................................. 382/181, 199, 382/203, 206, 209; 380/23

[56] References Cited

U.S. PATENT DOCUMENTS

| | | | |
|---|---|---|---|
| 3,419,287 | 12/1968 | Rudie | 283/7 |
| 3,872,438 | 3/1975 | Cuttill et al. | 340/149 A |
| 3,959,884 | 6/1976 | Jordan et al. | 340/146.3 |
| 4,047,154 | 9/1977 | Vitols et al. | 340/146.3 |
| 4,151,512 | 4/1979 | Riganati et al. | 340/146.3 |
| 4,156,230 | 5/1979 | Riganati et al. | 340/146.3 |
| 4,185,270 | 1/1980 | Fischer, II et al. | 340/146.3 |
| 4,208,651 | 6/1980 | McMahon | 340/146.3 |
| 4,210,899 | 7/1980 | Swonger et al. | 340/146.3 |
| 4,225,850 | 9/1980 | Chang et al. | 340/146.3 |
| 4,253,086 | 2/1981 | Szwarcbier | 340/146.3 |
| 4,260,979 | 4/1981 | Smith | 340/146.3 |
| 4,414,684 | 11/1983 | Blonder | 382/4 |
| 4,449,189 | 5/1984 | Feix et al. | 364/513.5 |
| 4,454,610 | 6/1984 | Sziklai | 382/3 |
| 4,525,859 | 7/1985 | Bowles et al. | 382/5 |
| 4,581,760 | 4/1986 | Schiller et al. | 382/4 |
| 4,607,384 | 8/1986 | Brooks | 382/4 |
| 4,618,988 | 10/1986 | Schiller | 382/5 |
| 4,636,622 | 1/1987 | Clark | 235/380 |
| 4,641,350 | 2/1987 | Bunn | 382/4 |
| 4,646,352 | 2/1987 | Asai et al. | 382/5 |
| 4,685,145 | 8/1987 | Schiller | 382/52 |
| 4,696,046 | 9/1987 | Schiller | 382/5 |
| 4,698,751 | 10/1987 | Parvin | 364/200 |
| 4,723,298 | 2/1988 | Schiller | 382/56 |
| 4,747,147 | 5/1988 | Sparrow | 382/4 |
| 4,752,966 | 6/1988 | Schiller | 382/5 |
| 4,777,651 | 10/1988 | McCann et al. | 382/21 |
| 4,787,742 | 11/1988 | Schiller et al. | 356/71 |
| 4,790,564 | 12/1988 | Larcher et al. | 283/69 |
| 4,805,223 | 2/1989 | Denyer | 382/4 |
| 4,811,414 | 3/1989 | Fishbine et al. | 382/52 |

(List continued on next page.)

FOREIGN PATENT DOCUMENTS

| | | | |
|---|---|---|---|
| 0159037 | 10/1985 | European Pat. Off. | G07C 9/00 |
| 4125198 | 5/1992 | Germany | G06K 19/073 |
| 5089324 | 8/1993 | Japan | G07D 9/00 |
| 1283748 | 8/1972 | United Kingdom | G07D 9/00 |
| 8203286 | 9/1982 | WIPO | G07C 11/00 |
| 9107728 | 5/1991 | WIPO | G06K 9/00 |

*Primary Examiner*—Tod R. Swann
*Assistant Examiner*—Todd Jack
*Attorney, Agent, or Firm*—Blakely, Sokoloff, Taylor & Zafman LLP

[57] ABSTRACT

A method and apparatus for generating a cryptographic key using biometric data is provided. A fingerprint is received, and features are extracted from the fingerprint. These features may include one or more of the following: A message is created based on the features of the fingerprint. For one embodiment, the message is a template including the features. For another embodiment, the message is a subset of features not included in a template. For another embodiment, the message is ghost points not corresponding to the features in the template. A message digest function is applied to the message to create a cryptographic key.

Another embodiment of the present invention uses features of the fingerprint image to generate a digital certificate. The public key used for the digital certificate is based on a fingerprint image. In one embodiment, the digital certificate contains a template including the fingerprint image or the features extracted from the fingerprint image. Verification of this template provides additional security to the validity of the digital certificate.

26 Claims, 9 Drawing Sheets

OTHER PUBLICATIONS

| | | |
|---|---|---|
| 4,817,183 | 3/1989 | Sparrow ........................................ 382/4 |
| 4,827,527 | 5/1989 | Morita et al. ................................ 382/4 |
| 4,837,843 | 6/1989 | Owechko ..................................... 382/31 |
| 4,876,725 | 10/1989 | Tomko et al. .............................. 382/4 |
| 4,876,726 | 10/1989 | Capello et al. ............................. 382/4 |
| 4,891,503 | 1/1990 | Jewell ...................................... 235/380 |
| 4,896,363 | 1/1990 | Taylor et al. .............................. 382/5 |
| 4,907,156 | 3/1990 | Doi et al. ........................... 364/413.13 |
| 4,933,976 | 6/1990 | Fishbine et al. ............................ 382/4 |
| 4,944,021 | 7/1990 | Hoshino et al. ............................ 382/5 |
| 4,947,442 | 8/1990 | Tanaka et al. .............................. 382/5 |
| 4,947,443 | 8/1990 | Costello ...................................... 382/5 |
| 4,956,870 | 9/1990 | Hara .......................................... 382/30 |
| 4,993,068 | 2/1991 | Piosenka et al. ......................... 380/23 |
| 4,995,086 | 2/1991 | Lilley et al. ................................ 382/4 |
| 5,040,223 | 8/1991 | Kamiya et al. ............................. 382/4 |
| 5,040,224 | 8/1991 | Hara ............................................. 382/4 |
| 5,050,220 | 9/1991 | Marsh et al. ................................ 382/4 |
| 5,050,222 | 9/1991 | Lee ............................................ 382/21 |
| 5,053,608 | 10/1991 | Senanayake ............................ 235/380 |
| 5,054,090 | 10/1991 | Knight et al. ............................. 382/4 |
| 5,067,162 | 11/1991 | Driscoll, Jr. et al. ....................... 324 |
| 5,095,194 | 3/1992 | Barbanell ................................. 235/379 |
| 5,101,436 | 3/1992 | DeAguiar et al. .......................... 382/1 |
| 5,105,467 | 4/1992 | Kim et al. ................................... 382/4 |
| 5,109,428 | 4/1992 | Igaki et al. .................................. 382/5 |
| 5,144,680 | 9/1992 | Kobayashi et al. ......................... 382/4 |
| 5,151,945 | 9/1992 | Lee et al. .................................... 382/1 |
| 5,175,593 | 12/1992 | Kumagai et al. .......................... 356/71 |
| 5,187,747 | 2/1993 | Capello et al. ............................. 382/4 |
| 5,187,748 | 2/1993 | Lee ............................................... 382/4 |
| 5,222,152 | 6/1993 | Fishbine et al. ............................. 382/2 |
| 5,222,153 | 6/1993 | Beiswenger ................................. 382/4 |
| 5,239,590 | 8/1993 | Yamamoto ................................... 382/4 |
| 5,402,324 | 3/1995 | Yokoyama et al. ....................... 362/19 |
| 5,416,573 | 5/1995 | Sartor, Jr. .................................. 356/71 |
| 5,448,649 | 9/1995 | Chen et al. ............................. 382/126 |
| 5,448,659 | 9/1995 | Tsutsui et al. ............................. 385/14 |
| 5,467,403 | 11/1995 | Fishbine et al. ........................ 382/116 |
| 5,493,621 | 2/1996 | Matsumura .............................. 382/125 |
| 5,509,083 | 4/1996 | Abtahi et al. ............................ 382/124 |
| 5,513,272 | 4/1996 | Bogosian, Jr. .......................... 382/116 |
| 5,522,623 | 6/1996 | Soules et al. ............................... 283/91 |
| 5,524,069 | 6/1996 | Inoue ....................................... 382/270 |
| 5,524,161 | 6/1996 | Omori et al. ............................ 382/125 |
| 5,530,757 | 6/1996 | Krawczyk .................................. 380/23 |
| 5,541,994 | 7/1996 | Tomko et al. .............................. 380/30 |
| 5,563,345 | 10/1996 | Kersten et al. ............................ 73/602 |
| 5,572,597 | 11/1996 | Chang et al. ............................ 382/125 |
| 5,613,012 | 3/1997 | Hoffman et al. ........................ 382/115 |
| 5,619,586 | 4/1997 | Sibbald .................................... 382/127 |
| 5,623,552 | 4/1997 | Lane ......................................... 382/124 |
| 5,625,448 | 4/1997 | Ranalli et al. ............................. 356/71 |
| 5,644,645 | 7/1997 | Osuga ...................................... 382/124 |
| 5,668,603 | 9/1997 | Copeland ................................. 348/473 |
| 5,680,205 | 10/1997 | Borza ......................................... 356/71 |
| 5,680,460 | 10/1997 | Tomko et al. .............................. 380/23 |
| 5,712,912 | 1/1998 | Tomko et al. .............................. 380/23 |
| 5,737,420 | 4/1998 | Tomko et al. .............................. 380/23 |
| 5,740,276 | 4/1998 | Tomko et al. ............................ 382/210 |
| 5,768,382 | 6/1998 | Schneider et al. ......................... 380/23 |
| 5,799,098 | 8/1998 | Ort et al. .................................. 382/125 |
| 5,841,865 | 11/1998 | Sudia ......................................... 380/21 |

CRYPTOGRAPHIC KEY GENERATION USING BIOMETRIC DATA

FIELD OF THE INVENTION

The present invention relates to cryptography, and more specifically, to the generation of a unique cryptographic key using biometric data.

BACKGROUND

As more and more information is moving into electronic form, encryption is becoming more common. One prior art method of encryption is public key encryption, an encryption scheme in which each person gets a pair of keys, called the public key and the private key. Each person's public key is published while the private key is kept secret. Messages are encrypted using the intended recipient's public key and can only be decrypted using the recipient's private key. Messages are signed using the sender's public key and can only be decrypted using the sender's public key. The need for sender and receiver to share secret information (keys) via some secure channel is eliminated—all communications involve only public keys, and no private key needs to be transmitted or shared. Public-key cryptography can be used for authentication (digital signatures) as well as for privacy (encryption). Other encryption schemes, such as symmetric key encryption rely on an exchange of keys.

However, keys generally are 64 bit numbers or larger and users do not memorize their keys. Rather, users store their key on their computer system. Because computer systems are rarely truly secure, the key may be taken from a computer system. In order to prevent this, the key may be stored in a password protected file. However, passwords may be broken. Additionally, the system is only as secure as the least secure level. Therefore, what is needed is a secure cryptographic key that is easily usable by the user, but not accessible to third parties.

SUMMARY OF THE INVENTION

The present invention relates to cryptography, and more specifically, to the generation of a unique cryptographic key using biometric data. A fingerprint is received, and features are extracted from the fingerprint. These features may include one or more of the following: A message is created based on the features of the fingerprint. For one embodiment, the message is a template including the features. For another embodiment, the message is a subset of features not included in a template. For another embodiment, the message is ghost points not corresponding to the features in the template. A message digest function is applied to the message to create a cryptographic key.

Another embodiment of the present invention uses features of the fingerprint image to generate a digital certificate. The public key used for the digital certificate is based on a fingerprint image. In one embodiment, the digital certificate contains a template including the fingerprint image or the features extracted from the fingerprint image. Verification of this template provides additional security to the validity of the digital certificate.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for generating a cryptographic key using biometric data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Figure 1:
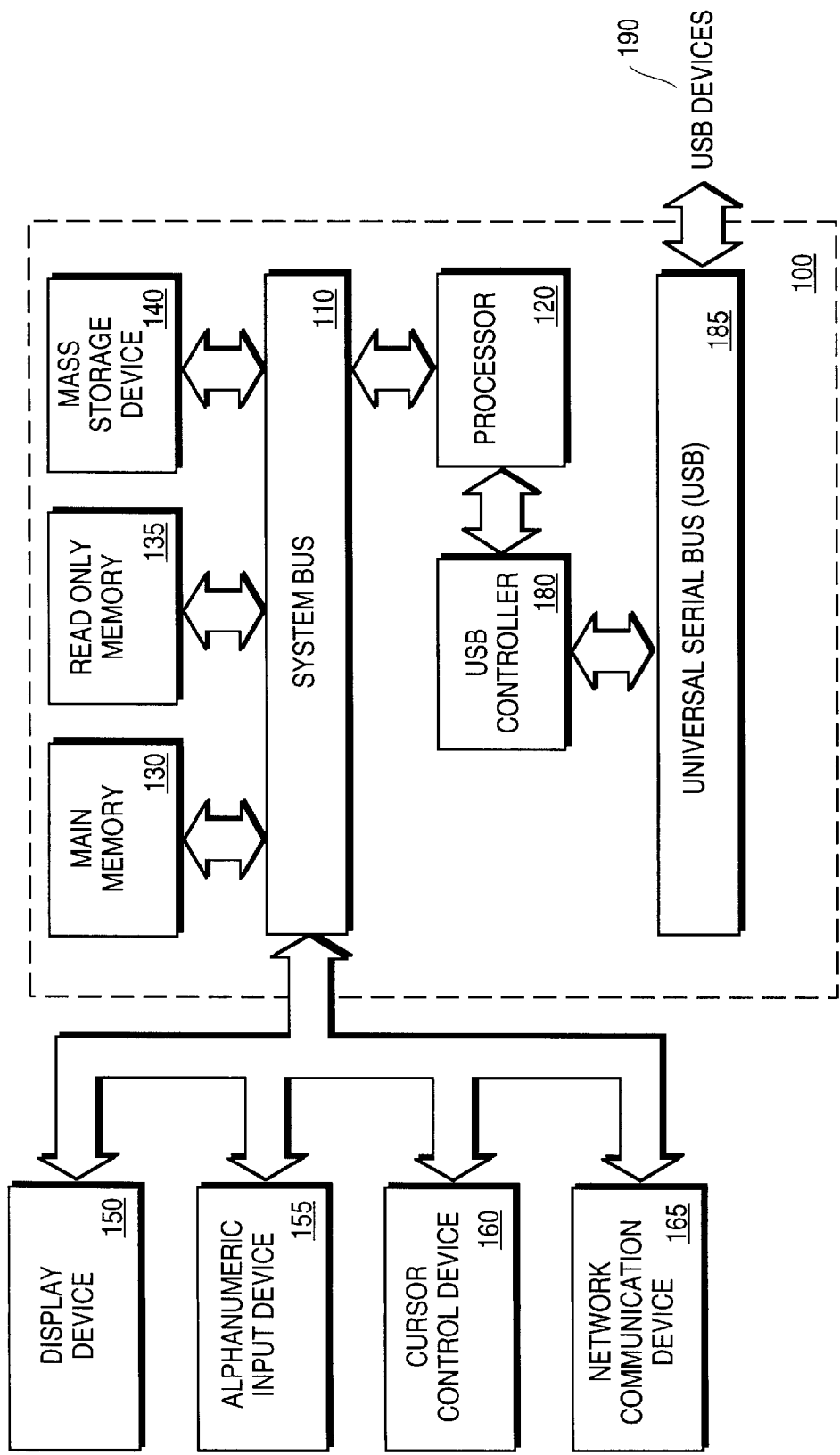
FIG. 1 is a computer system on which the present invention may be implemented.

FIG. 1 is a computer system on which the present invention may be implemented. FIG. 1 is a diagram of one embodiment of the digital system on which the present invention may be implemented. Digital system 10 comprises a system bus 110 or other communication means for communicating information, and a processor 120 coupled with system bus 110 for processing information. Digital system 100 also comprises a read only memory (ROM) and/or other static storage device 135 coupled to system bus 110 for storing static information and instructions for processor 120. The digital system 100 further comprises a main memory 130, a dynamic storage device for storing information and instructions to be executed. Main memory 130 also may be used for storing temporary variables or other intermediate information during execution of instructions. In one embodiment the main memory 130 is dynamic random access memory (DRAM).

Digital system 100 can also be coupled via system bus 110 to a display device 150, such as a cathode ray tube (CRT) or liquid crystal display (LCD) screen, for displaying information to a user. An alphanumeric input device 155 is typically coupled to system bus 110 for communicating information and command selections to processor 120. Another type of user input device is cursor control device 160, such as a mouse, a trackball, trackpad, or cursor direction keys for communicating direction information and command selections to processor 120 and for controlling cursor movement on display device 150. Alternatively, other input devices such as a stylus or pen can be used to interact with the display. The digital system 100 may further be coupled via the system bus 110 to a network communication device 165.

The network communication device 165 may be utilized to couple the digital system to other digital systems, servers, and networks.

Digital system 100 further comprises a universal serial bus (USB) controller 180, a bus controller for controlling a universal serial bus (USB) 185. The USB 185 is for coupling USB devices 190 to the digital system 100. A fingerprint sensor 195 is coupled to the digital system 100 via the USB 185. Alternately, the fingerprint sensor 195 may be coupled to the digital system 100 via the network communication device 165.

Figure 2:
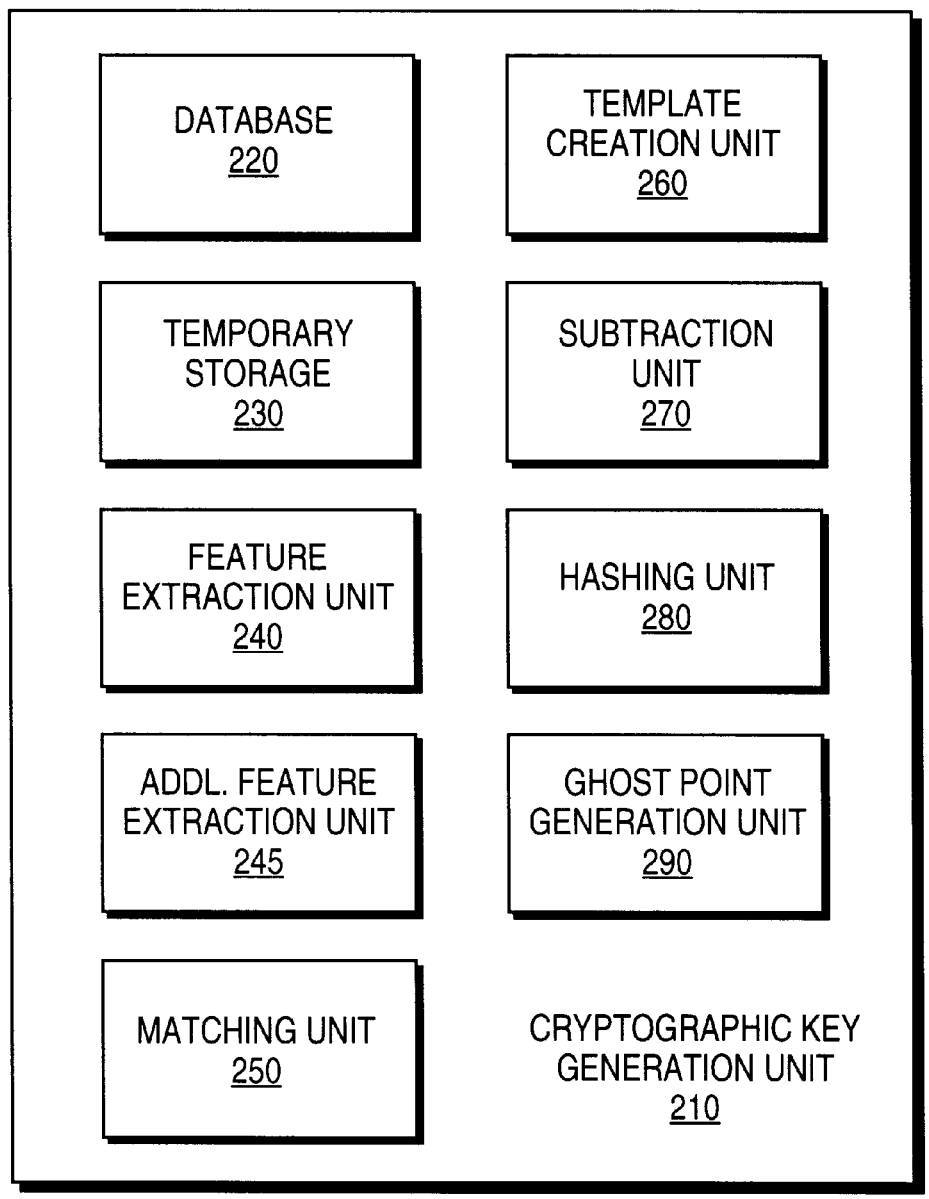
FIG. 2 is a block diagram of one embodiment of the apparatus of the present invention.

FIG. 2 is a block diagram of the apparatus of the present invention. For one embodiment, the cryptographic key generation unit 210 includes a database 220. The database 220 stores templates of fingerprints. For one embodiment, no database 220 is used, and templates are either not used or are stored with the encrypted files.

A temporary storage unit 230 stores data used for the processing and generation of the cryptographic key. For one embodiment, the temporary storage unit 230 is emptied once matching/generation is completed. For one embodiment, the cryptographic key generated is only stored in the temporary storage unit 230 for sufficient time to use it, and is then erased.

A feature extraction unit 240 receives a fingerprint from the fingerprint sensor 195. The feature extraction unit 240 extracts relevant features from the fingerprint. An additional feature extraction unit 245 extracts other features than minutiae. For one embodiment, these features may include minutiae, including location and orientation; spatial frequency; curvature; ridge count; ridge distance/curvature between points; relation to global features; code words generated by vector quantization to encode subunit spatial characteristics; etc. These features are stored in the temporary storage unit 230.

For one embodiment, the matching unit 250 is included in the cryptographic key generation unit 210. The matching unit 250 compares the extracted features of the fingerprint and the template and determines whether the fingerprint matches a template. For one embodiment, if the user is not known, the template creation unit 260 creates a template of the new user, and adds it to the database 220.

The hashing unit 280 creates a hash of the message created by the message creation unit 270. For one embodiment, a one-way hash function or message digest function is used to create the hash. The one-way hash function takes a variable-length message and produces a fixed-length hash. Given the hash it is computationally impossible to find a message with that hash; in fact one can not determine any usable information about a message with that hash. For some one-way hash functions it's also computationally impossible to determine two messages which produce the same hash. For one embodiment, this fixed-length hash is the cryptographic key associated with the user's fingerprint. For another embodiment, this fixed-length hash is the basis used to generate the cryptographic key. For one embodiment, the one-way hash function used is MD5. Alternatively, other hash functions may be used. For one embodiment, the fixed-length is 128 bits.

For one embodiment, the ghost generation unit 290 is further included in the cryptographic key generation unit 210. The ghost point generation unit 290 is used to generate ghost points to be included in the template. The function of the ghost units is explained below.

The subtraction 270 may be included in the cryptographic key generation unit 210. The subtraction unit 270 is used to remove extracted fingerprint features from a template which includes both fingerprint features and ghost points, in order to obtain the ghost points.

Figure 3:
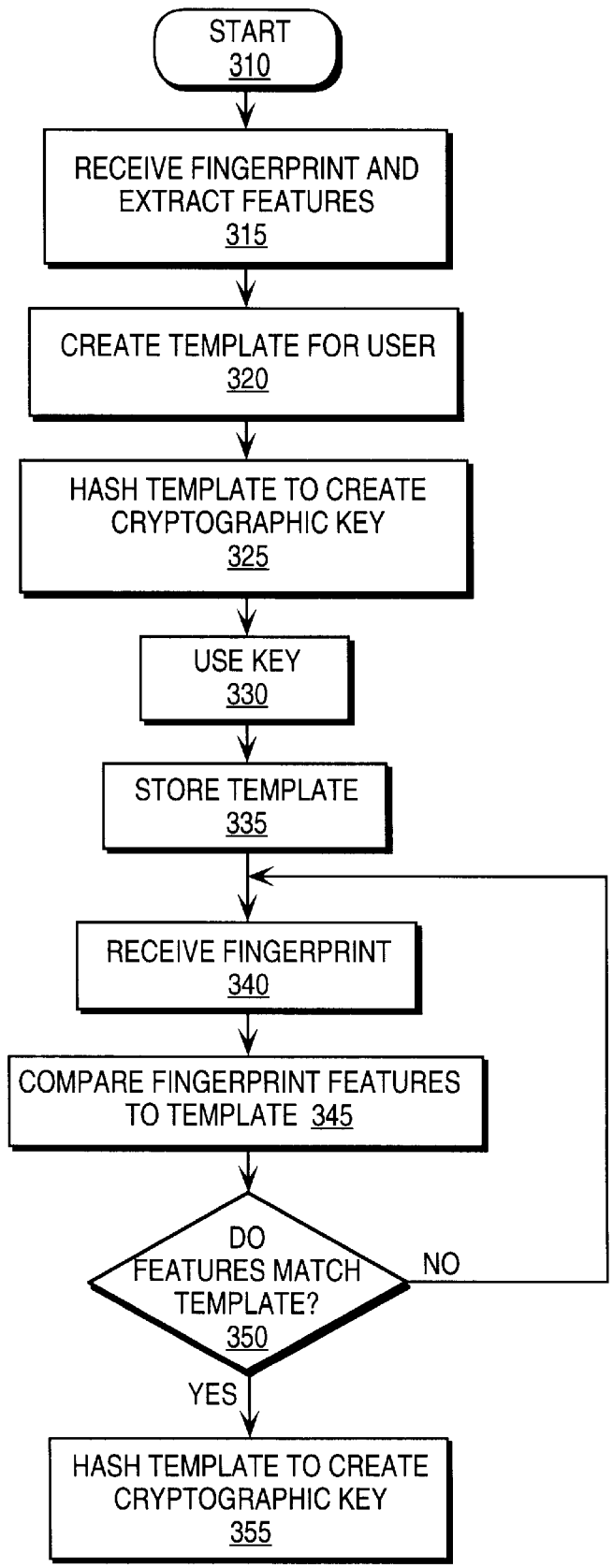
FIG. 3 is a flowchart illustrating one embodiment of generating and using the cryptographic key of the present invention.

FIG. 3 is a flowchart illustrating one embodiment of generating and using the cryptographic key of the present invention. At block 310, the process starts. At block 315, a fingerprint is received from the user. The fingerprint may be encrypted or otherwise protected. For one embodiment, a time and date stamp is included in the encrypted fingerprint to assure that the fingerprint was not generated previously and resent. If the fingerprint is encrypted or otherwise protected, it is decrypted, and a digital fingerprint image is generated. The features of the fingerprint are then extracted. These features may include one or more of the following: minutiae, including location and orientation; spatial frequency; curvature; ridge count; ridge distance/curvature between points; relation to global features; code words generated by vector quantization to encode subunit spatial characteristics; etc. Methods of extracting these features are known in the art.

At block 320, a template is created for the user. A template includes at least some of the features extracted from the fingerprint. For one embodiment, the template includes all of the identifying features extracted from the print.

At block 325, the template is hashed. For one embodiment, this hash is the cryptographic key. For another embodiment, known techniques are used on the hash to generate the cryptographic key. This cryptographic key is identified with the specific fingerprint, and thus with a specific user. For one embodiment, for a public key encryption, a private key is generated based on the hash. A public key is generated to correspond to the cryptographic key. Methods of generating a public key which corresponds to a private key are known in the art. Public key/private key pairs are known in the art, and are used to authenticate documents, encrypt documents, etc.

At block 330, the cryptographic key is used. For one embodiment, the cryptographic key is generated in order to do something specific. For example, the key may be used to sign a document with the user's private key. This allows the document to be decrypted with the user's public key, thus identifying the document as originating with the user. Alternately, a document may be encrypted with the user's public key, allowing decryption only with the user's private key, thus protecting the document from unauthorized users.

At block 335, the template is stored. The cryptographic key itself is not stored anywhere on the system. For one embodiment, the template is stored with the file for which it was used. Thus, if a document was encrypted, the template is attached to the document itself. For another embodiment, the template is stored in a database, or other more centralized location.

The initial use of the key is now complete. A file may have been encrypted. Such a file may be stored on the system, sent, or otherwise disposed of by the user. If the user wishes to decrypt an encrypted document, or otherwise use the cryptographic key again, the flowchart is entered at block 340.

At block 340, the fingerprint is received from the user. As described again, various verification techniques may be used to make sure that the fingerprint is a genuine fingerprint. The features of the fingerprint are extracted.

At block 345, the fingerprint features, newly extracted, are compared to the template. As described above with respect to block 320, the template includes some or all of the features previously extracted from the fingerprint. The comparison tests whether the fingerprint received belongs to the same user as the template.

At block 350, the process tests whether the features match the template. This comparison may be done using any method known in the art. The comparison of a fingerprint and a template is known in the art. If the features do not match the template, the process continues to block 340. For one embodiment, a new fingerprint is requested. If the features do match, the process continues to block 355.

At block 355, the template is again hashed to create a cryptographic key. Since the template was used to generate the first cryptographic key, the same key is generated. The key can then be used in the above described manner.

Figure 4:
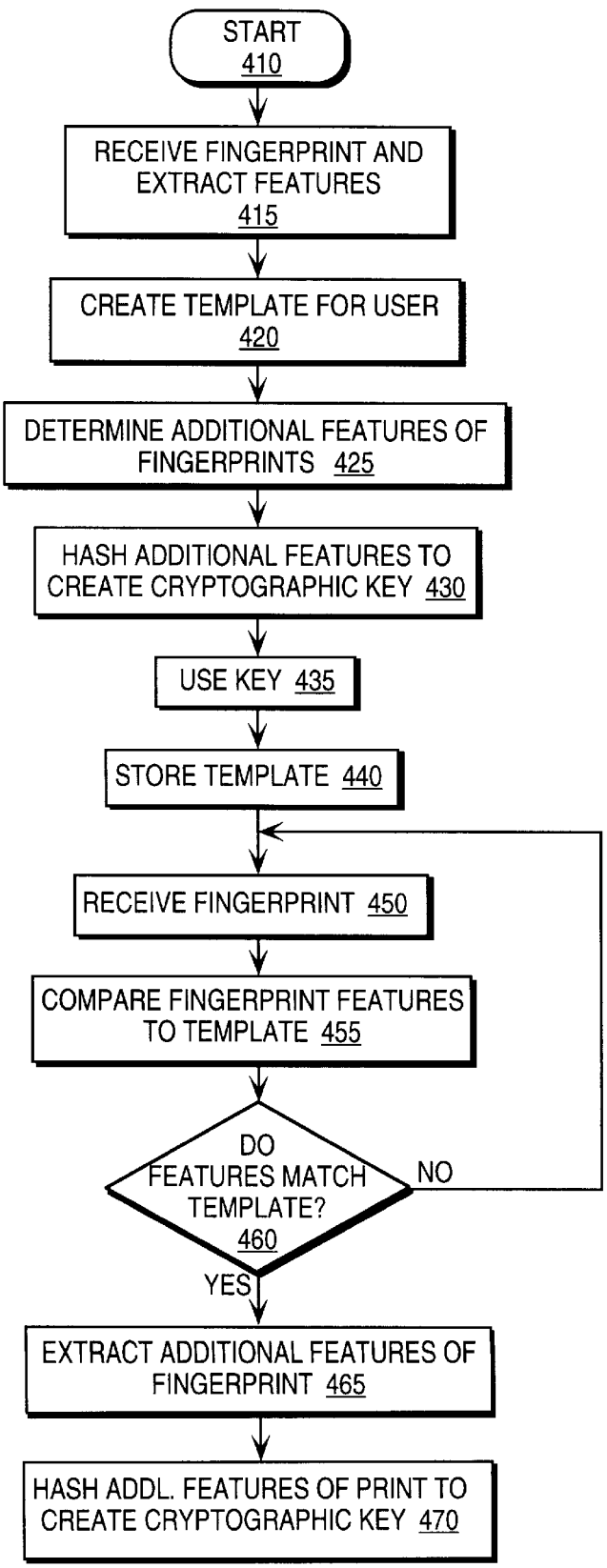
FIG. 4 is a flowchart illustrating another embodiment of generating and using the cryptographic key of the present invention.

FIG. 4 is a flowchart illustrating another embodiment of generating and using the cryptographic key of the present invention.

At block 410, the process starts. At block 415, a fingerprint is received from the user. The fingerprint may be encrypted or otherwise protected. For one embodiment, a time and date stamp is included in the encrypted fingerprint to assure that the fingerprint was not generated previously and resent. If the fingerprint is encrypted or otherwise protected, it is decrypted, and a digital fingerprint image is generated. The features of the fingerprint are then extracted. These features may include one or more of the following: minutiae, including location and orientation; spatial frequency; curvature; ridge count; ridge distance/curvature between points; relation to global features; etc. Methods of extracting these features are known in the art.

At block 420, a template is created for the user. A template includes at least some of the features extracted from the fingerprint. For one embodiment, the template includes only the minutiae location and orientations. Thus, may other features, such as spatial frequency, curvature, ridge count, ridge distance/curvature between points, relation to global features are not included in the template, and code words generated by vector quantization to encode subunit spatial characteristics.

At block 425, these additional features are determined and placed into a temporary message.

At block 430, the message containing only the additional features are hashed. For one embodiment, this hash is the cryptographic key. For another embodiment, the hash is used to generate a cryptographic key. For one embodiment, the hash generates a private key. A corresponding public key is generated as well.

At block 435, the key is used, as described above.

At block 440, the template is stored. The template contains only the minutiae of the fingerprint. Therefore, even if a hacker accesses the template, the hacker can not deduce the cryptographic key. The additional features used to generate the cryptographic key are not included in the template.

The initial use of the key is complete at this point. The template may have been stored with the file(s) for which it was used. Alternately, the template may be in a database. If the user wishes to reuse the key, to access the previously encrypted file, or to encrypt a new file, the process starts at block 450.

At block 450, the fingerprint is received from the user. As described above, various verification techniques may be used to make sure that the fingerprint is a genuine fingerprint. The features of the fingerprint are extracted.

At block 455, the fingerprint features, newly extracted, are compared to the template. As described above with respect to block 420, the template includes some of the features previously extracted from the fingerprint. The comparison tests whether the fingerprint received belongs to the same user as the template.

At block 460, the process tests whether the features match the template. This comparison may be done using any method known in the art. The comparison of a fingerprint and a template is known in the art. If the features do not match the template, the process continues to block 450. For one embodiment, a new fingerprint is requested. If the features do match, the process continues to block 465.

At block 465, additional features of the fingerprint are extracted.

At block 470, these additional features are determined and placed into a temporary message. The message containing only the additional features are then hashed to generate a cryptographic key. For one embodiment, the hash is used to generate a private key. A corresponding public key is generated as well. Because the additional features correspond to the same fingerprint, the message generated is identical to the original message. This results in reproducing the original cryptographic key. The key can now be used, as is known in the art.

Figure 5:
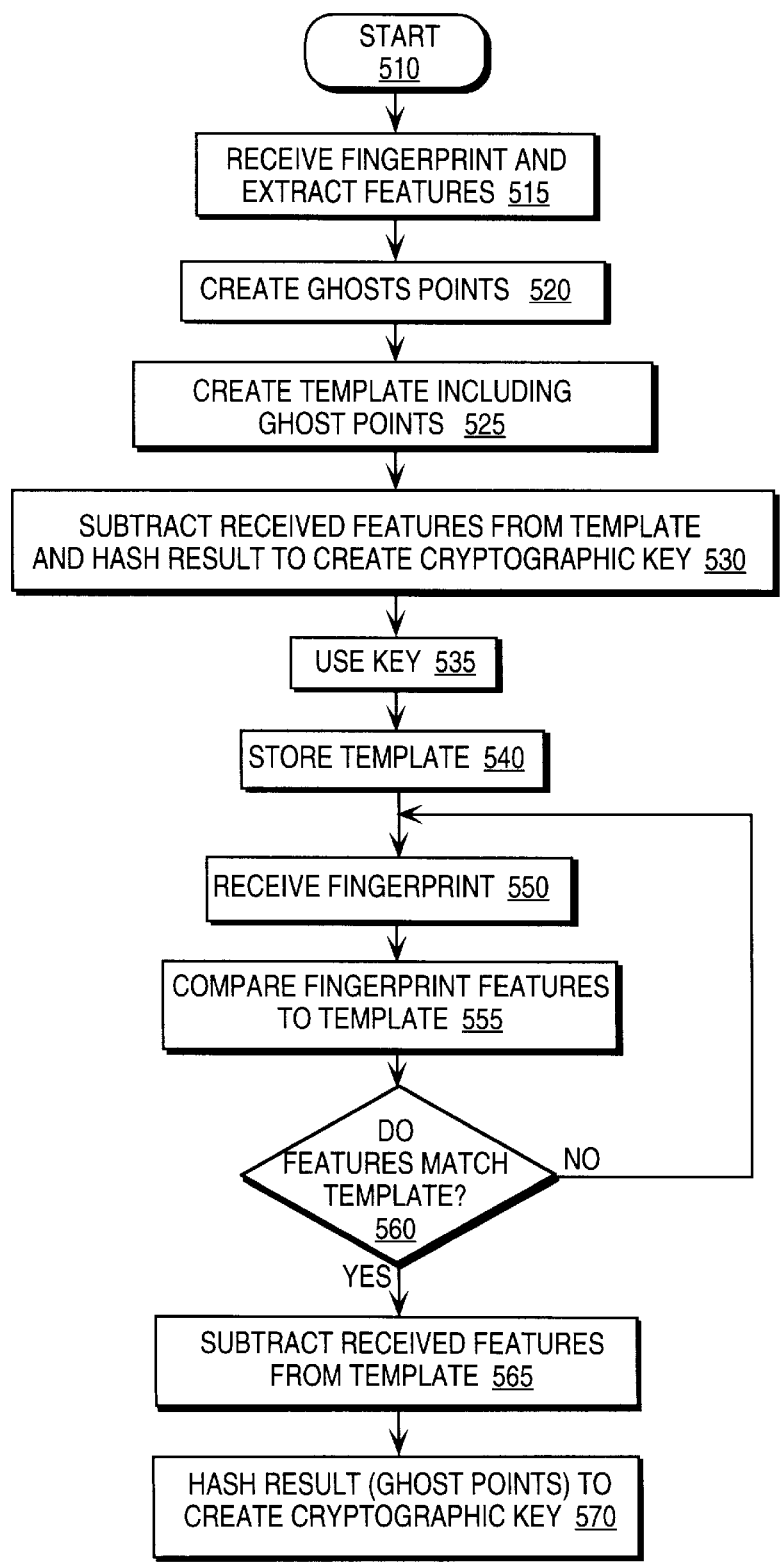
FIG. 5 is a flowchart illustrating another embodiment of generating and using the cryptographic key of the present invention.

FIG. 5 is a flowchart illustrating another embodiment of generating and using the cryptographic key of the present invention. At block 510, the process starts.

At block 515, the fingerprint is received, and the features of the fingerprint are extracted. The features are those described above.

Figure 9:
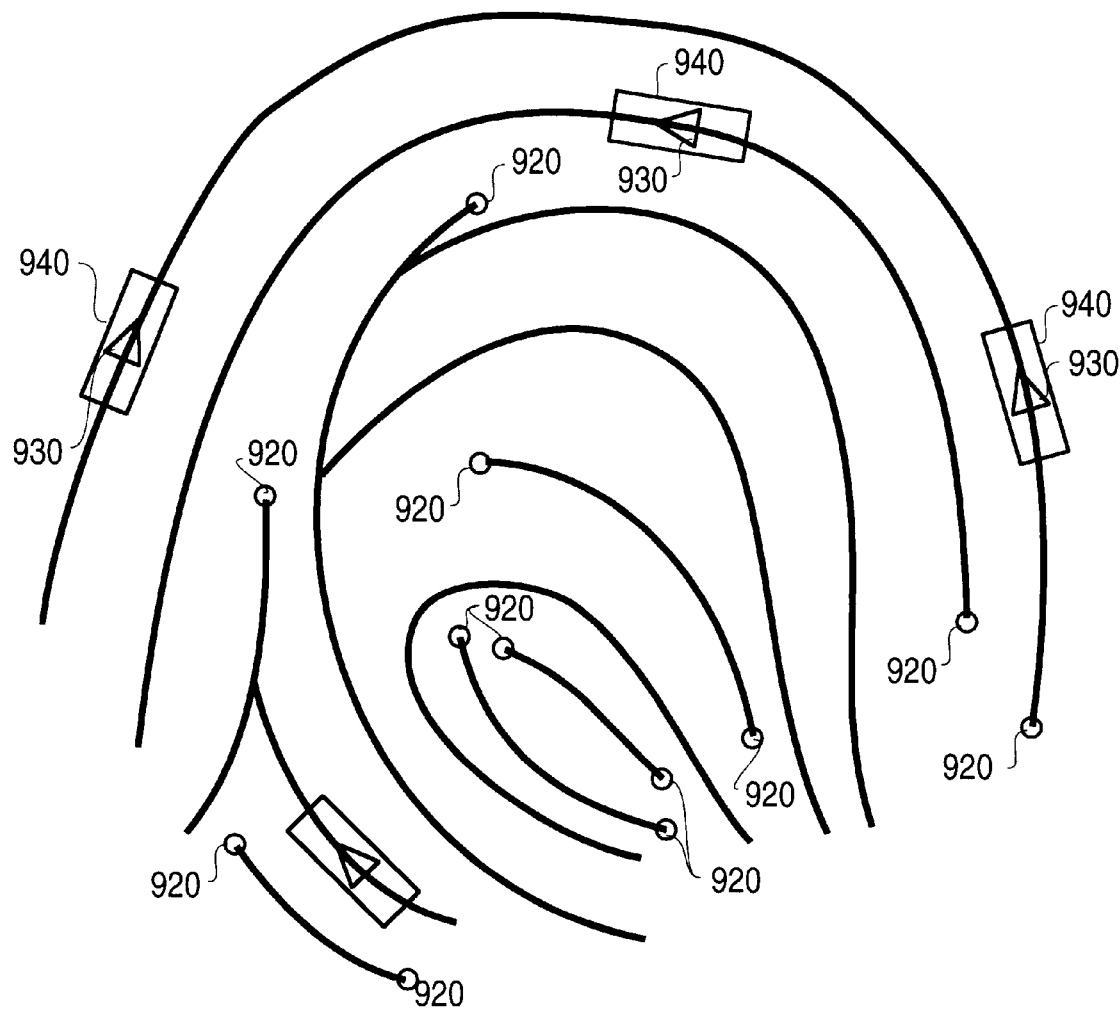
FIG. 9 is an illustration of one example of a fingerprint including marked minutiae and ghost points.

At block 520, ghost points are generated. The ghost points are false features which are placed into the fingerprint. FIG. 9 illustrates a fingerprint with a plurality of marked minutiae 920. FIG. 9 also includes ghost points 930 placed in clear areas 940 of the fingerprint. Clear areas 940 are areas which do not have actual, or probable, minutia points. For example, a clear area may be along a continuous ridge. Since minutia points are ridge beginnings, endings, or forks, along a continuous ridge, no minutia points are likely to occur. By selecting clear areas, areas 940 in which it is unlikely that there could be a minutia, errors are minimized. Ghost points 930 are assigned an orientation, in addition to the location. For alternative embodiment, ghost points 930 are not located in clear areas 940 but have orientations which are highly unlikely. Ridges in fingerprints are continuous, therefore, a ghost point along a ridge which points at a ninety degree angle from the direction of the ridge is highly unlikely. Alternative means of placing points that can be distinguished from real minutiae on comparison with the fingerprint may be used.

Returning to FIG. 5, at block 525, a template is created including ghost points. The ghost points are included in the template without any notation. On examining the template, one can not differentiate between actual minutiae and ghost points. The way to identify ghost points is by examining the actual fingerprint.

At block 530, the extracted features are subtracted from the template. This leaves the ghost points which were added to the template. The ghost points are hashed, to create the cryptographic key.

At block 535, the cryptographic key may be used for any known uses. At block 540, the template, including the ghost points, are stored. For one embodiment, the template is stored with the files that were encrypted/authenticated. For another embodiment, the template is stored in a database.

At block 540, the template, including the ghost points, is stored. The template may be stored in a database, or with the file(s) that were encrypted. At this point the cryptographic key has been used. In order to decrypt an encrypted file, or to use the key again, the process continues at block 550.

At block 550, the fingerprint is received, and the features are extracted.

At block 555, the features extracted from the fingerprint are compared to the template. For one embodiment, in examining the points of the template, comparing them to the fingerprint each of the points is examined separately.

At block 560, it is determined whether the features match the template. If the extracted features do not match, i.e. it is not the same user, the process returns to block 550. For one embodiment, a new fingerprint is automatically requested. If the extracted features do match, the process continues at block 565.

At block 565, the extracted features are subtracted from the template, leaving only the ghost points, the ghost points forming a ghost template.

At block 570, the result, i.e. the ghost points, are hashed to create the cryptographic key. Because the cryptographic key is generated from the same set of ghost points as above in block 530, the same key is generated. Therefore, any files encrypted with the key may be decrypted.

Figure 6:
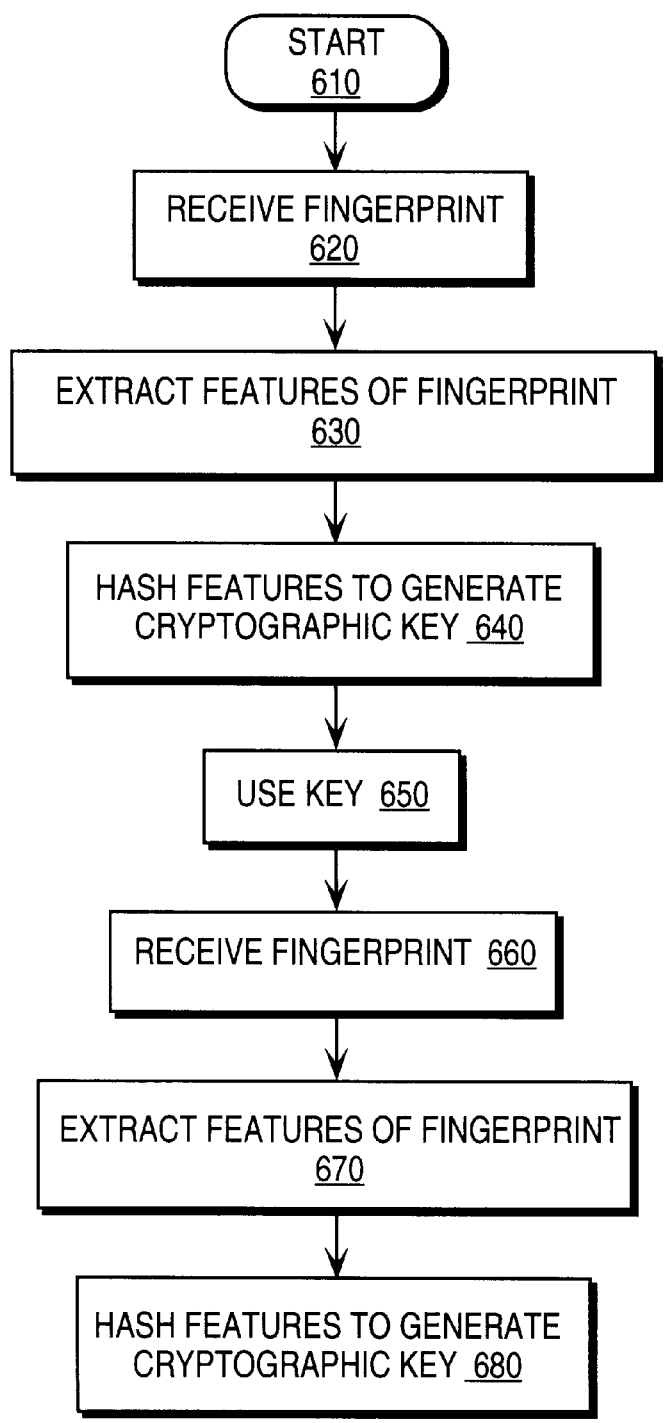
FIG. 6 is a flowchart illustrating another embodiment of generating and using the cryptographic key of the present invention.

FIG. 6 is a flowchart illustrating another embodiment of generating and using the cryptographic key of the present invention. At block 610, the process starts.

At block 620, the fingerprint is received.

At block 630, the features of the fingerprint are extracted. The features may include minutiae, including location and orientation; spatial frequency; curvature; ridge count; ridge distance/curvature between points; relation to global features; code words generated by vector quantization to encode subunit spatial characteristics; etc. These features may be further evaluated for clarity. For one embodiment, only those features with high clarity are retained.

At block 640, the features are hashed. This hash may be the cryptographic key. Alternatively, known algorithms may be used to generate a cryptographic key from the hash. The cryptographic key includes some or all of the features of the original fingerprint.

At block 650, the key may be used, to encrypt or authenticate files, or for any other purpose. The initial generation of the key is now complete. After the key is used, it is not retained. No template is generated.

In order to decrypt the file, or otherwise use the key again, the process is restarted at block 660. At block 660, the fingerprint is received.

At block 670, the features of the fingerprint are extracted. For one embodiment, these features are the same as the features extracted above, at block 630. For another embodiment, some additional features may be extracted. For one embodiment, the user may place his or her finger on the scanner multiple times, to generate a composite image which better represents the actual fingerprint image.

At block 680, the extracted features are hashed. This hash may be the cryptographic key. Alternatively, known algorithms may be used to generate a cryptographic key from the hash. This cryptographic key is identical to the cryptographic key generated at block 640. For one embodiment, the cryptographic key generated is a private key, and it and the corresponding public key, can be used to decrypt the previously encrypted file, or for other uses.

For one embodiment, generating the identical cryptographic key is a two step process. After the features are extracted, they may be jiggled slightly, to generate different hashes. That is, the features may be moved incrementally, to compensate for a user not placing his or her finger in exactly the same location as when generating the original cryptographic key. For one embodiment, the initial features extracted are an initial condition for the cryptographic key. The hash generated from the initial features is used to search the local key space. Alternative methods of matching the positioning of the fingerprint may be used.

Figure 7:
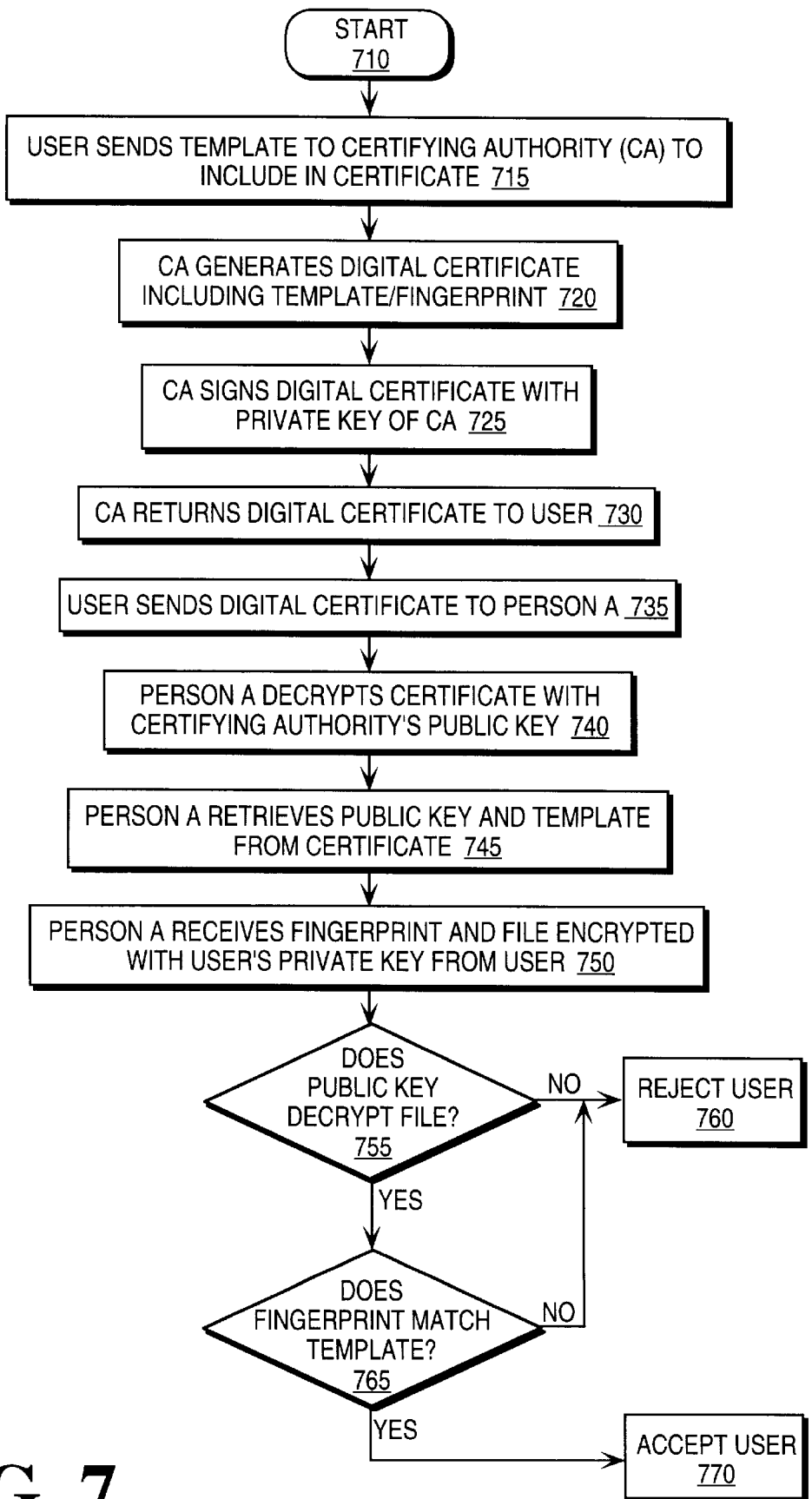
FIG. 7 is a flowchart illustrating one embodiment of the generating and using a digital certificate according to the present invention.

FIG. 7 is a flowchart illustrating one embodiment of the generating and using a digital certificate according to the present invention. Digital certificates bind an identity to a pair of electronic keys that can be used to encrypt and sign digital information. The digital certificate makes it possible to verify a user's claim that they have the right to use a given key, helping to prevent the use of false keys to impersonate a user. Digital certificates are generally issued by a certification authority, and signed by the certification authority's private key. The certification authority certifies that the holder of the key pair is actually who he or she claims to be. The digital certificate generally includes the owner's public key, the owner's name, the expiration date of the public key, the name of the issuer (the certification authority), the serial number of the digital certificate, and the digital signature of the issuer. By sending the digital certificate, a user can make sure that an "authentic" copy of the public key of the user is known.

At block 710, the process starts. The registration process for obtaining the digital certificate is illustrated in blocks 715–730. The process for using the digital certificate is illustrated in blocks 735–770.

At block 715, the user sends a fingerprint template to the certification authority (CA) to include in a digital certificate. For one embodiment, the fingerprint template is a digital image of the fingerprint. For another embodiment, the fingerprint template is a template of features extracted from the fingerprint. The CA uses other information of the user's to verify the identity of the user. For example, a social security number may be used. Alternately, other similar information may be used to check the identity of the user whose fingerprint is received by the CA.

At block 720, a digital certificate is generated by the certification authority. In addition to including the above listed information in the certificate, the fingerprint template are also included by the certification authority. Thus, the owner of the fingerprint is further identified by the fingerprint template.

At block 725, the CA signs the digital key of the CA. The signature of the CA certifies that the digital certificate is authentic, to the best knowledge of the CA.

At block 730, the CA returns the digital certificate to the user. The user now has possession of the digital certificate, and can use it to authenticate his or her identity to third parties.

At block 735, the user wishes to use the digital certificate to authenticate his or her identity to a third party, for example Person A. The user sends the digital certificate to Person A to authenticate his or her identity.

At block 740, Person A decrypts the certificate with the certifying authority's public key. This tells Person A that the digital certificate is authentic. Thus, Person A knows that the digital certificate has not been altered.

At block 745, Person A retrieves the public key and fingerprint template enclosed in the certificate. Both the public key and fingerprint template identify the user associated with the user.

At block 750, Person A receives a file encrypted with the user's private key from the user. Additionally, a fingerprint is received from the user. For one embodiment, after Person A decrypts the certificate with the CA's public key, Person A requests the encrypted file and fingerprint from the user. For another embodiment, the user automatically sends a fingerprint and encrypted file when sending the digital certificate to Person A.

At block 755, Person A tests whether the public key, retrieved from the digital certificate, decrypts the file encrypted with the user's private key. A file encrypted with a private key may be decrypted with the corresponding public key. Therefore, this informs Person A that the user is in possession of the private key corresponding to the digital certificate. For one embodiment, this encrypted file is encrypted with the above described encryption mechanism using the fingerprint of the person. If the public key decrypts the file, the process continues to block 765. If the public key does not decrypt the file, the process continues to block 760. At block 760, the user is rejected.

At block 765, the fingerprint received from the user is compared to the fingerprint template retrieved from the digital certificate. For one embodiment, the comparison is of a template of extracted features. If the fingerprint does not match the template, the process returns to block 760, and the user is rejected. If the fingerprint matches the fingerprint template, the process continues to block 770, and the user is accepted. At this point Person A knows that the digital certificate is authentic, and is associated with the user who is currently using the certificate. This provides an additional level of security for using digital certificates.

Figure 8:
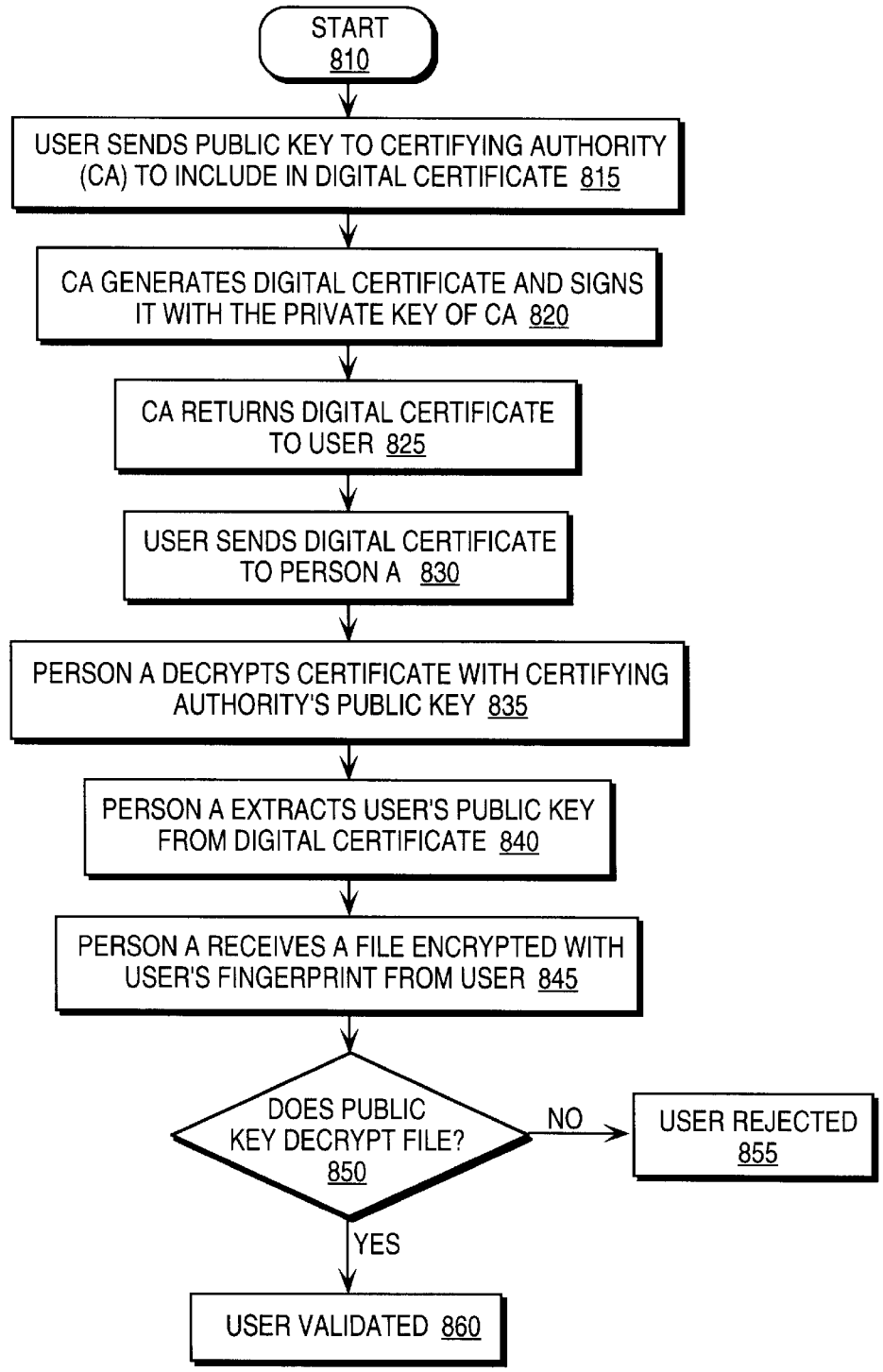
FIG. 8 is a flowchart illustrating another embodiment of the generating and using a digital certificate according to the present invention.

FIG. 8 is a flowchart illustrating another embodiment of the generating and using a digital certificate according to the present invention.

At block 810, the process starts. The registration process for obtaining the digital certificate is illustrated in blocks 815–825. The process for using the digital certificate is illustrated in blocks 830–860.

At block 815, the user sends a public key to the certification authority (CA) to be included in the digital certificate. The CA uses other information of the user's to verify the identity of the user. For example, a social security number may be used. Alternately, other similar information may be used to check the identity of the user.

At block 820, the CA generates the digital certificate including the public key, and signs it with the digital key of the CA. The signature of the CA certifies that the digital certificate is authentic, to the best knowledge of the CA.

At block 825, the CA returns the digital certificate to the user. The user now has possession of the digital certificate, and can use it to authenticate his or her identity to third parties.

At block 830, the user wishes to use the digital certificate to authenticate his or her identity to a third party, for example Person A. The user sends the digital certificate to Person A to authenticate his or her identity.

At block 835, Person A decrypts the certificate with the certifying authority's public key. This tells Person A that the digital certificate is authentic. Thus, Person A knows that the digital certificate has not been altered.

At block 840, Person A retrieves the public key enclosed in the certificate. Both the public key identifies the user associated with the user.

At block 845, Person A receives a file encrypted with the user's private key from the user. The private key used by the user is generated from the user's fingerprint, as described above.

For one embodiment, after Person A decrypts the certificate with the CA's public key, Person A requests the encrypted file from the user. For another embodiment, the user automatically sends an encrypted file when sending the digital certificate to Person A.

At block 850, Person A tests whether the public key, retrieved from the digital certificate, decrypts the file encrypted with the user's private key. A file encrypted with a private key may be decrypted with the corresponding public key. Therefore, this informs Person A that the user is in possession of the private key corresponding to the digital certificate. For one embodiment, this encrypted file is encrypted with the above described encryption mechanism using the fingerprint of the person.

If the public key decrypts the file, the process continues to block 860, and the user is validated. If the public key does not decrypt the file, the process continues to block 855, and the user is rejected.

At block 765, the fingerprint received from the user is compared to the fingerprint template retrieved from the digital certificate. For one embodiment, the comparison is of a template of extracted features. If the fingerprint does not match the template, the process returns to block 760, and the user is rejected. If the fingerprint matches the fingerprint template, the process continues to block 770, and the user is accepted. At this point Person A knows that the digital certificate is authentic, and is associated with the user who is currently using the certificate. This provides an additional level of security for using digital certificates.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. The present invention should not be construed as limited by such embodiments and examples, but rather construed according to the following claims.

What is claimed is:

1. A method comprising the computer implemented steps of:

receiving a fingerprint;

extracting minutiae from the fingerprint;

creating a message based on the minutiae of the fingerprint, comprising:

creating ghost points not corresponding to features of the fingerprint;

creating a template including the features and the ghost points;

subtracting the features from the template, leaving a ghost template, the ghost template being the message; and storing the template;

applying a message digest function to the message to create a cryptographic key.

2. The method of claim 1, wherein said step of creating the message comprises the step of creating a template including the features of the fingerprint, wherein said template comprises the message.

3. The method of claim 2, further comprising a step of retrieving the cryptographic key comprising the steps of:

receiving a new fingerprint;

retrieving the template;

comparing the new fingerprint with the template;

if the new fingerprint matches the template, applying the message digest function to the template to generate the cryptographic key.

4. The method of claim 1, wherein said step of creating the message comprises the step of extracting additional features from the fingerprint, the additional features comprising the message.

5. The method of claim 4 further comprising the step of retrieving the cryptographic key comprising the steps of:
   receiving a new fingerprint;
   retrieving the message;
   extracting a primary set of features from the new fingerprint;
   extracting a secondary set of features from the new fingerprint;
   comparing the primary set of features to the message;
   if the primary set of features match the messages, applying the message digest function to the secondary set of features to create the cryptographic key.

6. The method of claim 1, further comprising the step of retrieving the cryptographic key comprising the steps of:
   receiving a new fingerprint;
   retrieving the template;
   extracting a new set of features from the new fingerprint;
   comparing the new set of features to the template;
   and if the new set of features match the template:
      subtracting the new set of features from the template, generating the ghost template;
      applying the message digest function to the ghost template to create the cryptographic key.

7. The method of claim 1, wherein said step of creating the message comprises the step of combining the features of the fingerprint to create the message.

8. The method of claim 7, further comprising a step of retrieving the cryptographic key comprising the steps of:
   receiving a new fingerprint;
   extracting features from the new fingerprint;
   creating the message digest function of the new fingerprint;
   applying the message digest function to the template to create a new cryptographic key, the new cartographic key identical to the cryptographic key previously generated.

9. A method comprising the computer implemented steps of:
   receiving a fingerprint;
   extracting features from the fingerprint;
   creating a template of the features of the fingerprint;
   extracting additional features from the fingerprint, the additional features comprising the message;
   applying a message digest function to the message to create a cryptographic key;
   wherein the message is not stored; and
   in order to retrieve the cryptographic key, performing the steps of:
      receiving a new fingerprint;
      extracting the features from the new fingerprint;
      creating a new template of the features of the new fingerprint;
      extracting the additional features from the new fingerprint;
      comparing the new template to the stored template; and
      if the features match the stored template, applying the message digest function to the additional features to create a new cryptographic key, the new cryptographic key identical to the cryptographic key previously generated.

10. The method of claim 9, further comprising:
    storing the template with each file that is encrypted using the cryptographic key.

11. The method of claim 9, further comprising:
    storing the template in a database.

12. The method of claim 9, further comprising a step of retrieving the cryptographic key comprising the steps of:
    receiving a new fingerprint;
    retrieving the template;
    comparing the new fingerprint with the template;
    if the new fingerprint matches the template, applying the message digest function to the template to generate the cryptographic key.

13. The method of claim 9, wherein said step of applying the message digest function comprises an MD5 algorithm.

14. A method comprising the computer implemented steps of:
    receiving a fingerprint;
    extracting a first set of features from the fingerprint;
    extracting a second set of features from the fingerprint;
    creating a template of the first set of features;
    applying a message digest function to the second set of features to create a cryptographic key; and
    storing the template with the first set of features.

15. The method of claim 14 further comprising the step of retrieving the cryptographic key including the steps of:
    receiving a new fingerprint;
    retrieving the template;
    extracting a primary set of features from the new fingerprint;
    extracting a secondary set of features from the new fingerprint;
    comparing the primary set of features to the template;
    if the primary set of features match the template, applying the message digest function to the secondary set of features to create the cryptographic key.

16. A method comprising the computer implemented steps of:
    receiving a fingerprint;
    extracting a set of features from the fingerprint;
    generating ghost points, not corresponding to actual features of the fingerprint;
    creating a template of the set of features and the ghost points;
    subtracting the set of features from the template, generating a ghost template;
    applying a message digest function to the ghost template to create a cryptographic key; and
    storing the template.

17. The method of claim 16, further comprising the step of retrieving the cryptographic key including the steps of:
    receiving a new fingerprint;
    retrieving the template;
    extracting a new set of features from the new fingerprint;
    comparing the new set of features to the template;
    and if the new set of features match the template:
       subtracting the new set of features from the template, generating a new ghost template;

applying the message digest function to the new ghost template to create a new cryptographic key.

18. A method comprising the computer implemented steps of:
   a certifying authority receiving a public key corresponding to a private key generated based on a user's fingerprint;
   including the public key and the user's fingerprint template in a digital certificate;
   signing the digital certificate with a private key of the certifying authority.

19. The method of claim 18, further comprising the steps of:
   sending the digital certificate to a third party for authentication of the user;
   the third party decrypting the digital certificate; and
   the user sending a message encrypted with the user's fingerprint based private key; and
   the third party decrypting the message with the public key included in the digital certificate to verify an identity of the user.

20. The method of claim 18, further comprising the steps of:
   sending the digital certificate to a third party for authentication of the user;
   the third party decrypting the digital certificate; and
   the user sending a fingerprint image to the third party; and
   the third party comparing the fingerprint image to the fingerprint template to verify an identity of the user.

21. The method of claim 14, wherein said step of applying the message digest function comprises an MD5 algorithm.

22. The method of claim 14, wherein the first set of features comprise a plurality of minutiae.

23. The method of claim 14, wherein the second set of features comprise one or more of the following features: spatial frequency, curvature, ridge count, ridge distance/curvature between points, relationship of features to global features, and other spatial characteristics.

24. The method of claim 1, wherein the step of receiving the fingerprint comprises receiving multiple fingerprints and generating a composite fingerprint image.

25. The method of claim 1, further comprising:
   jiggling the images to generate a plurality of different messages.

26. The method of claim 16, wherein the step of receiving the fingerprint comprises receiving multiple fingerprints and generating a composite fingerprint image.

* * * * *